P. J. SIMMEN.
RAILWAY SIGNAL SYSTEM.
APPLICATION FILED SEPT. 26, 1913.
1,239,049.
Patented Sept. 4, 1917.
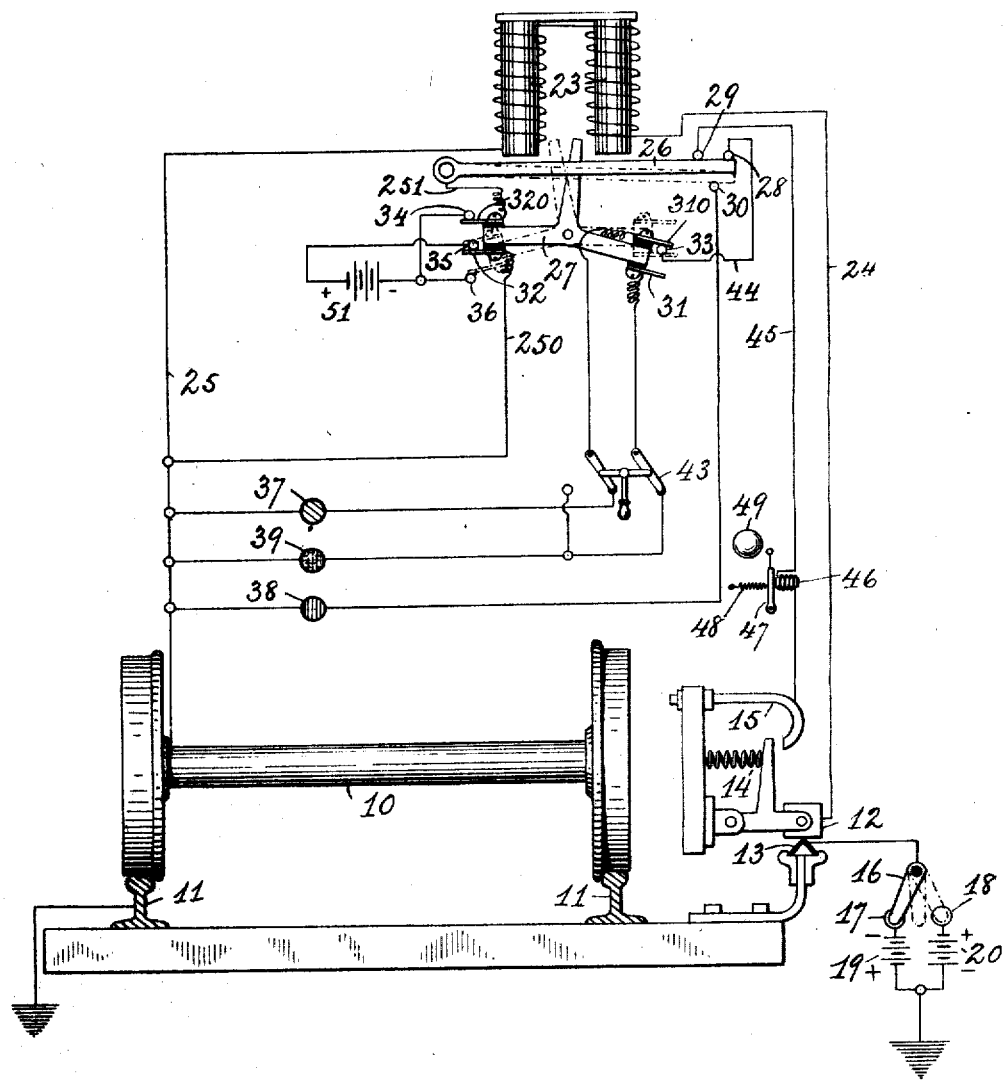
Attest:
Clarence G. Campbell
Mary H. Lewis
Paul J. Simmen, Inventor:
by William R. Baird
his Atty

UNITED STATES PATENT OFFICE.

PAUL J. SIMMEN, OF INDIANAPOLIS, INDIANA.

RAILWAY SIGNAL SYSTEM.

1,239,049.  Specification of Letters Patent.  Patented Sept. 4, 1917.

Application filed September 26, 1913.  Serial No. 791,990.

*To all whom it may concern:*

Be it known that I, PAUL J. SIMMEN, a citizen of the United States, residing at Indianapolis, in the county of Marion and State of Indiana, have invented certain new and useful Improvements in Railway Signal Systems, of which the following is a specification.

This invention relates to signals for moving vehicles adapted to advise the operator whether conditions for proceeding indicate safety, danger, or the necessity for caution.

The object of the invention is to provide a signal system whereby different signals may be given at will to moving vehicles. In the preferred form of the invention, three signals are used. These are differently colored lights located in the operator's cab; for instance, the clear, the danger, and the caution signal are green, red, and yellow lights respectively; also a clear signal intended for one vehicle produces a different signal, such as a cautionary signal, is received by another. A particularly advantageous instance for the application of such a system is in cases where it is desired that one vehicle should follow closely behind another on the same track, in which case the first vehicle may be given a clear signal and the second a caution signal. Another such instance is where a single track road is used for traffic in both directions, and clear signals intended for vehicles going in one direction produce caution signals if received by vehicles going in the opposite direction.

The mechanism is applicable for use in the system disclosed in co-pending application, Serial No. 791,451, filed September 24, 1913.

In the drawings there is shown a preferred embodiment of the invention, parts being shown diagrammatically.

In the drawings, 10 indicates the axle of a vehicle provided with wheels traveling on rails 11 which may be suitably grounded. The vehicle carries a yielding shoe 12 adapted to contact with a signal rail 13 against the tension of a spring 14 which presses it normally into engagement with an arm 15 also carried by the vehicle. There are a number of such signal rails arranged at suitable intervals along the way, and the shoe is lifted when in contact therewith and out of contact with the arm 15. These rails may be either electrically deënergized or energized positively or negatively with respect to the track rails 11 at will by means of a switch 16 movable into or out of engagement with either of the contact members 17 and 18 of two batteries 19 and 20, the other terminals of which are suitably grounded.

The vehicle also carries an electro-magnet indicated at 23 which has one end of its winding connected by a wire 24 to the shoe 12, and the other end thereof grounded, for instance, by a wire 25 connected to the axle 10. The magnet 23 has a pivoted non-polarized armature 26 and a pivoted polarized armature 27. The position of the armature 26 depends wholly upon whether or not the electro-magnet 23 is energized regardless of the direction of the flow of the current in its windings, such armature being moved to its upper or full line position, and into engagement with the contacts 28 and 29 when the magnet is energized and dropping into its lower or dotted line position, and into engagement with a contact member 30 when the magnet is deënergized. The position of the polarized armature 27 depends upon the direction of the flow of the current through the magnet. It is moved to one position, shown in full line, when the current flows in one direction and to another position, shown in dotted line, when the current flows in the opposite direction, remaining in either position in which it happens to be when the magnet becomes deënergized. It carries a pair of oppositely arranged arms one provided with fingers 31 and 310 which respectively engage a contact 33 when the armature 27 is in its full line and dotted line positions, and the other provided with a pair of fingers 32 and 320 which engage contacts 34 and 35 respectively when such armature is in its full line position and contacts 35 and 36 respectively when it is in its dotted line position. Each contact finger 31 and 310 is connected to one terminal of a clear signal lamp 37 conventionally colored green or with one terminal of a caution signal lamp 39 conventionally colored yellow, through a reversing switch 43 whereby either finger may be connected to either lamp. The contact 30 is connected to one terminal of a danger lamp 38 conventionally colored red. The other terminal of each of these lamps 37, 38, and 39 is connected to the wire 25. The fingers 320 and 32 are connected respectively to the non-polarized armature 26 and to the wire 25 by conductors 251 and 250. The contacts 34 and 36 are connected in common to one side of a local battery 51 conveniently carried on the vehicle, the other side of which battery is connected to the contact 35. The contacts 28 and 33 are connected together by a wire 44. The contact 29 is connected to the arm 15 by a wire 45 preferably including the coil of an electro-magnet 46 having an armature 47 which is drawn away from the magnet by a spring 48 and taps a bell 49 when the magnet becomes deënergized. The signal lamps 37, 38 and 39 are conveniently located in the operator's cab and within the usual range of vision.

The operation of the device is as follows:

Assuming that the signal rail 13 is negatively energized with respect to the track rails 11, by reason of the fact that the switch 16 is in engagement with the member 17 when the vehicle reaches this rail 13, its shoe 12 is lifted to the position shown in the drawing and a current passes from the positive side of the battery 19 through the earth and the rail 11 to the axle 10, thence through the wire 25, the magnet 23, and wire 24, the shoe 12, the rail 13, the switch 16, and the member 17 to the negative side of the battery 19. The resultant energization of the magnet 23 lifts the armature 26 to its full line position (if it is not already lifted) and moves the armature 27 to its full line position (if it is not already in such position). The switch 43 being in the position shown in the drawing a current passes from the positive side of the battery 51 through the contact 35, the finger 32, the wires 250 and 25, the green lamp 37, one arm of the switch 43, the finger 310, the contact 33, the wire 44, the contact 28, the armature 26, the finger 320, and the contact 34 to the negative side of the battery 51, and the lamp 37 is lighted and gives a clear signal to operator which light or signal continues after the vehicle passes beyond the rail 13, and the shoe 12 drops and engages the arm 15, because the armatures 26 and 27 are held in their positions by a continuance of the energization of the magnet 23, with the same polarity as before by a current from the battery 51, which current passes from the positive side of such battery through the contact 35, the finger 32, the wires 250 and 25, the magnet 23, the wire 24, the shoe 12, the arm 15, the magnet 46, the wire 45, the contact 29, the armature 26, the finger 320, and the contact 34 to the negative side of the battery 50. In other words, although the impulse through the signal rails 13 is intermittent as they are arranged in succession along the track the indication of the clear signal is continuous.

If the signal rail is deënergized when the shoe 12 passes over it, because for instance the switch 16 is in its middle position, there results a deënergization of the magnet 23, for the local circuit through the battery 51 is broken by the separation of the shoe 12 from the arm 15 and there is no current to take its place from either the battery 19 or 20. Consequently the armature 26 drops to the position shown in dotted line in the drawing and closes a circuit from the positive side of the battery 51, through the contact 35, the finger 32, the wires 250 and 25, the lamp 38, the contact 30, the armature 26 in its lower position, the finger 320, and the contact 34 to the negative side of the battery 51, and the lamp 38 glows and displays a red light on seeing which the operator should stop the vehicle and take such steps as are necessary for protection. Furthermore his attention is called to the possibility of a change in signals when the signal rail is reached by the shoe 12 by the sounding of the bell 49 upon the deënergization of the magnet 46 which results from the separation of the shoe 12 from the arm 15. If the vehicle does not stop with the shoe 12 on the rail 13, but proceeds beyond such rail, the reëngagement of the shoe 12 with the arm 15 does not reëstablish the local circuit from the magnet 23, because such circuit is broken by the disengagement of the contact 29 and armature 26 and the latter remains in engagement with the contact 30. Therefore the danger signal also persists after the passage of the vehicle beyond the deënergized rail 13. In other words in this case also there is a continuous signal indication from an intermittent impulse.

If the rail 13 is positively energized with respect to the track rails 11, by reason of the fact that the switch 16 is in engagement with the member 18, the contact of the shoe 12 with the rail 13 closes a circuit from the positive side of the battery 20 through the member 18, the switch 16, the rail 13, the shoe 12, the wire 24, the magnet 23, the wire 25, the axle 10, and the grounded track rails 11 to the negative side of the battery 20. The resultant energization of the magnet 23 is in the reverse direction from that produced when the rail 13 was negatively energized, and lifts or holds lifted the armature 26 and moves the armature 27 to the position shown in dotted outline in the drawing, breaks the circuit for the green lamp 37 already described, and establishes a circuit for the yellow lamp 39, which circuit is from the positive side of the battery 51 through the contact 35, the finger 320 (for the armature 27 has moved to its dotted line position), the conductor 251, the armature 26, the contact 28, the wire 44, the contact 33, the contact finger 31, one arm of the switch 43, the yellow lamp 39, the wire 25, the finger 32, and the contact 36 to the negative side of the battery 51. Thus with the switch 43 in the position shown, the positive energization of the rail 13 produces a caution signal, upon receiving which, to which his attention is also called by the tapping of the bell 49 the operator should stop the vehicle and take such steps as are necessary. However, if he does not stop it, but proceeds beyond the rail 13, the shoe 12 reëngages the arm 15 and passes out of engagement with the rail 13 which reëstablishes the circuit for the magnet 23, but with the current flowing in the reverse direction from that already described, or in the same direction as that from the positively energized rail 13. Such circuit is from the positive side of the battery 51 through the contact 35, the finger 320, the armature 26, the contact 29, the wire 45, the magnet 46, the arm 15, the shoe 12, the wire 24, the magnet 23, the wire 25, the finger 32, and the contact 36 to the negative side of the battery 51. Consequently, the armatures 26 and 27 remain in their positions and the circuit for the yellow lamp is maintained, and the caution signal persists after the vehicle has passed the positively energized rail 13. So that in this case also there is a continuous signal indication with an intermittent impulse.

According to the foregoing when the switch 43 is in one position the negative energization of the signal rail 13 produces a green or clear signal, the positive energization of the signal rail, a yellow or caution signal, and the deënergization of the signal rail a red or danger signal. By throwing the switch 43 to its other position, the connections of the green and yellow lamps 37 and 39 are interchanged, so that the positive energization of the signal rail 13 produces a green or clear signal, the negative energization of such rail a yellow or caution signal, and the deënergization of the signal rail a red or danger signal. It should also be noted that the impulse to the signal rail from the switch 16 is over a single wire, but that by varying the polarity of the current passing over such wire the three functions of displaying clear, caution and danger signals are accomplished, a result which has heretofore been possible only by the use of three wires.

What I claim is:

1. A signal system for a vehicle moving along a trackway, comprising three signals on the vehicle, two electro-magnetically operated devices, one being polarized, adapted jointly to control said signals, and means along the trackway electrically energizable and deënergizable to control said devices, and an audible signal which is adapted to be automatically actuated when the vehicle passes the means along the trackway to give warning of a possible change from one of said signals to another of said signals.

2. A signal system for a vehicle moving along a trackway, comprising three signals on the vehicle, two electro-magnetically operated devices, one being polarized, adapted jointly to control said signals, and means along the trackway electrically energizable adapted to control said devices and an audible signal adapted to be automatically actuated when such polarity is varied.

3. A signal system for a vehicle moving along a trackway, comprising three signals on the vehicle, two electro-magnetically operated devices, one being polarized, adapted jointly to control said signals, means along the trackway energizable either positively or negatively and also deënergizable to control said electro-magnetically operated devices, and an audible signal which is adapted to be automatically actuated when the vehicle passes said means along the trackway to give warning of a possible change from one of said signals.

4. A signal system for a vehicle moving along a trackway, comprising three signals on the vehicle, two electro-magnetically operated devices, one being polarized, adapted jointly to control said signals, means along the trackway energizable either positively or negatively and also deënergizable to control said electro-magnetically operated devices, and an audible signal which is adapted to be automatically actuated when the vehicle passes said means along the trackway and give warning of a possible change to one of said signals.

5. A railway signal system comprising trackside contact mechanism, means for energizing the same and varying its polarity, three signals carried by a vehicle adapted to move on the trackway, means for operating them, including an electro-magnet, which automatically causes the operation of one of the signals when the trackside mechanism carries a positive current, of another of them when it carries a negative current and of the third of them when it is deënergized, in combination with means for automatically operating a fourth signal to give warning of a possible change from one or to any one of the three signals.

6. A railway signal system comprising trackside contact mechanism, means for energizing the same and varying its polarity, three signals carried by a vehicle adapted to move on the trackway, means for operating them, including an electro-magnet, and mechanism associated with said electro-magnet for automatically causing the operation of one of the signals when the trackside mechanism carries a positive current, of another of them when it carries a negative current and of the third of them when it is deënergized, in combination with an automatically operated signal of a different character which warns of a possible change in the operation of any of the other signals.

7. A signal system for a vehicle moving along a trackway, comprising a clear signal, a caution signal, and a danger signal all carried by the vehicle, electro-magnetically operated means adapted to produce the operation of the clear signal when energized in one direction, the operation of the caution signal when energized in the other direction, and the operation of the danger signal when deënergized, and means located along the trackway for controlling the energization and deënergization and the direction of energization of said electro-magnetically operated means, and an audible signal which is automatically operated when the vehicle passes said means along the trackway to give warning of the operation of the danger signal.

8. A signal system for a vehicle moving along a trackway, comprising three visual signals, viz: a clear signal, a caution signal, and a danger signal all carried by the vehicle, electro-magnetically operated means adapted to produce the operation of the clear signal when energized in one direction, the operation of the caution signal when energized in the other direction, and the operation of the danger signal when deënergized, and means located along the trackway for controlling the energization and deënergization and the direction of energization of said electro-magnetically operated means, and an audible signal adapted to be automatically sounded as a mere incident of the actuation of the danger signal.

9. A signal system for a vehicle moving along a trackway, comprising three visual signals, viz: a clear signal, a caution signal, and a danger signal all carried by the vehicle, electro-magnetically operated means adapted to produce the operation of the clear signal when energized in one direction, the operation of the caution signal when energized in the other direction, and the operation of the danger signal when deënergized, and means located along the trackway for controlling the energization and deënergization and the direction of energization of said electro-magnetically operated means, and an audible signal adapted to be automatically sounded as a mere incident of the discontinuance of the clear signal.

10. A signal system for a vehicle moving along a trackway, comprising a clear signal, a caution signal, and a danger signal all carried by the vehicle, electro-magnetically operated means adapted to produce the operation of the clear signal when energized in one direction, the operation of the caution signal when energized in the other direction, and the operation of the danger signal when deënergized, and means located along the trackway for controlling the energization and the direction of energization of said electro-magnetically operated means, and an audible signal which is operated when the vehicle passes said means along the trackway and operation of the clear signal is discontinued.

11. A signal system for railways, comprising an electro-magnet, a polarized armature and a non-polarized armature therefor, two vehicle carried signals made operative when with the non-polarized armature in one position and the polarized armature is in its two positions respectively, a third vehicle carried signal made operative when the non-polarized armature is in its other position and means along the trackway for controlling the energization and deënergization and the direction of the energization of the magnet, a double throw switch which in its two positions respectively in rchanges the relation between the first two signals and the direction of energization of the magnet, a source of electric energy for maintaining the energization of said magnet after the means along the trackway has been passed by the car, and means for reversing the connections of said source of energy to the magnet by the operation of the polarized armature.

12. A signal system for railways, comprising an electro-magnet, a polarized armature and a non-polarized armature therefor, two vehicle carried signals which are made operative when with the non-polarized armature in one position the polarized armature is in its two positions respectively, a third vehicle carried signal which is made operative when said non-polarized armature is in its other position, means along the trackway for controlling the energization and deënergization and the direction of the energization of the armature-actuating means, and a double throw switch which in its two positions respectively interchanges the relation between the first two signals and the direction of energization of the magnet.

13. A signal system for railways, comprising an electro-magnet, a polarized armature and a non-polarized armature therefor, two vehicle carried signals which are made operative when with the non-polarized armature in one position the polarized armature is in its two positions respectively, a third vehicle carried signal which is made operative when said non-polarized armature is in its other position, means along the trackway for controlling the energization and deënergization and the direction of the energization of the armature-actuating means, and a double throw switch which in its two positions respectively interchanges the relation between the first two signals and the direction of energization of the magnet, and a source of electric energy for maintaining the energization of said magnet after the means along the trackway has been passed by the car.

14. A signal system for a vehicle moving along a trackway, comprising three signals on the vehicle, an electro-magnet, two armatures controlled thereby, one being polarized, means including the armatures for jointly controlling said signals, whereby one or the other of said signals is always displayed on the vehicle, in combination with means along the trackway electrically energizable and deënergizable to control the magnet.

15. A signal system for a vehicle moving along a trackway, comprising three signals on the vehicle, an electro-magnet, two armatures controlled thereby, one being polarized, means including the armatures for jointly controlling said signals, whereby one or the other of said signals is always displayed on the vehicle, in combination with means along the trackway electrically energizable, adapted to control said magnet, and means for varying its polarity.

16. A signal system for a vehicle moving along a trackway, comprising three signals on the vehicle, an electro-magnet, two armatures controlled thereby, one being polarized, means including the armatures for jointly controlling said signals, whereby one or the other of said signals is always displayed on the vehicle, in combination with means along the trackway electrically energizable, adapted to control said magnet, and means for varying its polarity, including a single wire leading to means along the track, two sources of electrical energy along the track, and a switch adapted to connect the wire to either source.

17. The combination with a vehicle movable along a trackway, of a controlling vehicle circuit, electro-magnetic means in said circuit, an armature controlled by said electro-magnetic means and controlling the said vehicle circuit, means intermittently interrupting the circuit as the car moves along the trackway to permit the deënergization of said circuit, means along the trackway for effecting a varied energization of the circuit when so interrupted or leaving it deënergized, and signaling devices controlled by the said vehicle circuit and adapted to be selectively operated by the character of the energization, or by the deënergization of the circuit when so interrupted.

18. The combination with a vehicle movable along a trackway, of a controlling vehicle circuit, electro-magnetic means in said circuit, an armature controlled by said electro-magnetic means and controlling the vehicle circuit, means for intermittently interrupting the circuit as the car moves along the trackway to permit the deënergization of said circuit, means along the trackway for causing a current of either polarity to pass through the circuit when so broken or for leaving it deënergized, three electrically operated devices, and means controlled by said circuit for effecting the operation of one device when a current of one polarity is passed through said circuit, for effecting the operation of a second device when a current of an opposite polarity is passed through said circuit, and for effecting the operation of the third device when the circuit is deënergized.

19. The combination with a vehicle movable along a trackway, of a controlling vehicle circuit, electro-magnetic means in said circuit, an armature controlled by said electro-magnetic means and controlling the vehicle circuit, means for intermittently interrupting the circuit as the car moves along the trackway to permit the deënergization of said circuit, means along the trackway for causing a current of either polarity to be passed through the circuit when so interrupted or for leaving it deënergized, three electrically operated devices, and circuits for the devices controlled by the aforesaid armature to selectively operate the same according to the polarity of the current passed through the vehicle circuit or the lack of a current therein.

20. The combination with a vehicle movable along a trackway, of a controlling vehicle circuit, electro-magnetic means in said circuit, a neutral armature controlled by said electro-magnetic means and controlling the vehicle circuit, a polarized armature controlled by said electro-magnetic means, means for intermittently interrupting the vehicle circuit as the car moves along the trackway to permit the deënergization of said circuit, means along the trackway for causing a current of either polarity to pass through the circuit when so interrupted or for leaving it deënergized, three electrically operated devices, and circuits for the devices, two of said last mentioned circuits being controlled by the polarized armature, and all three of said last mentioned circuits being controlled by the neutral armature.

In testimony whereof I affix my signature in presence of two witnesses.

PAUL J. SIMMEN.

Witnesses:
R. H. MOORE,
CLARENCE GUSGATT.